United States Patent
Maki

(10) Patent No.: US 10,127,394 B2
(45) Date of Patent: Nov. 13, 2018

(54) IMAGE FORMING APPARATUS FOR ENSURING HIGH SECURITY LEVEL, METHOD OF CONTROLLING IMAGE FORMING APPARATUS, INFORMATION PROCESSING APPARATUS, METHOD OF CONTROLLING INFORMATION PROCESSING APPARATUS, AND STORAGE MEDIUM, THAT PROVIDE SECURITY FOR RESERVING A PRINT JOB

(71) Applicant: CANON KABUSHIKI KAISHA, Tokyo (JP)

(72) Inventor: Nobuhiko Maki, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/070,622

(22) Filed: Mar. 15, 2016

(65) Prior Publication Data

US 2016/0275297 A1 Sep. 22, 2016

(30) Foreign Application Priority Data

Mar. 18, 2015 (JP) .................................. 2015-054836

(51) Int. Cl.
*G06F 21/60* (2013.01)
*G06F 3/12* (2006.01)

(52) U.S. Cl.
CPC .......... *G06F 21/608* (2013.01); *G06F 3/1222* (2013.01); *G06F 3/1238* (2013.01); *G06F 3/1267* (2013.01); *G06F 3/1285* (2013.01); *G06F 2221/2113* (2013.01)

(58) Field of Classification Search
None
See application file for complete search history.

(56) References Cited

U.S. PATENT DOCUMENTS

| | | | | |
|---|---|---|---|---|
| 2011/0090533 A1* | 4/2011 | Shimizu | ................ | G06F 3/1222 358/1.15 |
| 2011/0170131 A1* | 7/2011 | Kondo | ............... | H04N 1/00954 358/1.14 |
| 2011/0255112 A1* | 10/2011 | Martin | .................. | G06F 3/1222 358/1.13 |
| 2014/0340702 A1* | 11/2014 | Maki | ..................... | G06F 3/1285 358/1.14 |
| 2014/0376027 A1* | 12/2014 | Adachi | ............. | G06K 15/4095 358/1.14 |
| 2015/0128239 A1* | 5/2015 | Kakutani | .............. | H04L 63/083 726/7 |

FOREIGN PATENT DOCUMENTS

| | | |
|---|---|---|
| JP | 2012153092 A | 8/2012 |
| JP | 2015037879 A | 2/2015 |

OTHER PUBLICATIONS

Korean Office Action issued in Korean Appln. No. 10-2016-0032140 dated Mar. 14, 2018.

* cited by examiner

*Primary Examiner* — Andrew H Lam
(74) *Attorney, Agent, or Firm* — Rossi, Kimms & McDowell LLP

(57) ABSTRACT

An image forming apparatus that is capable of ensuring a high security level. An image forming apparatus receives a print job from an information processing apparatus connected to the MFP via a network. When a security policy specifying reservation of a received print job is set for the image forming apparatus, the received print job is not immediately executed, but is reserved therein.

6 Claims, 12 Drawing Sheets

FIG. 3A

```
CONDITION SETTING SCREEN
                                    302
                                  ┌─
SHEET SIZE: A4              ☑  USE SECURE PRINT
301— NUMBER OF COPIES: 1
STAMP: NONE
                             OK  ─303  CANCEL
```

FIG. 3B

```
JOB AUTHENTICATION INFORMATION-SETTING SCREEN

ID  │ User 1        │ —304
PRINT PASSWORD   │ * * * * * * *  │ —305

OK  —306      CANCEL
```

FIG. 10

PRINT PASSWORD INPUT

JOB NAME: Document 1
USER NAME: User 1 ~1001

PRINT PASSWORD
\*\*\*\*\*\*\*\*\*\* ~1002

CANCEL    OK ~1003

IMAGE FORMING APPARATUS FOR ENSURING HIGH SECURITY LEVEL, METHOD OF CONTROLLING IMAGE FORMING APPARATUS, INFORMATION PROCESSING APPARATUS, METHOD OF CONTROLLING INFORMATION PROCESSING APPARATUS, AND STORAGE MEDIUM, THAT PROVIDE SECURITY FOR RESERVING A PRINT JOB

BACKGROUND OF THE INVENTION

Field of the Invention

The present invention relates to an image forming apparatus that is capable of ensuring a high security level, a method of controlling the image forming apparatus, an information processing apparatus, a method of controlling the information processing apparatus, and a storage medium.

Description of the Related Art

Conventionally, there has been known an image forming apparatus that performs a secure print job as a print job (see e.g. Japanese Patent Laid-Open Publication No. 2015-037879). The secure print job is a print job requiring a high security level, and is performed e.g. when printing print data including confidential information. More specifically, a user instructs an image forming apparatus to perform a secure print job from a PC connected to the image forming apparatus. In doing this, job authentication information formed by an ID and a password, which is necessary for execution of the secure print job, is set in the secure print job. The image forming apparatus receives the secure print job, and reserves the received secure print job in a storage device, such as an HDD, provided in the image forming apparatus. After that, the user moves to the image forming apparatus, and directly instructs the image forming apparatus to execute the reserved secure print job via a console section provided on the image forming apparatus. The image forming apparatus instructed to execute the secure print job requests the user to input the job authentication information, and when the job authentication information input by the user matches the job authentication information set in the secure print job, the image forming apparatus executes the secure print job.

Incidentally, the image forming apparatus performs not only a secure print job, but also a print job other than the secure print job (hereinafter referred to as the "normal job"), which requires no job authentication information. In the case of an image forming apparatus which is not equipped with a user authentication function for requesting a user to perform user authentication by login before using the image forming apparatus, when a normal job is received, the received normal job is immediately executed. Further, even with an image forming apparatus equipped with the user authentication function, if the user authentication function has not been enabled, when a normal job is received, the received normal job is immediately executed.

Under such circumstances, however, there is a case where a user erroneously prints print data by a normal print job, which should be printed as a secure print job high in security level. More specifically, there is a case where a user intends to instruct the image forming apparatus to perform a secure print job from a PC, but erroneously instructs the image forming apparatus to execute a normal job from the PC. In this case, the image forming apparatus instructed to execute the normal job immediately executes the print job as mentioned above, and a printing result is immediately discharged from the image forming apparatus. On the other hand, the user does not notice that he/she has erroneously instructed the image forming apparatus to execute the normal job, and assumes that the secure print job is reserved in the image forming apparatus, and hence the user does not immediately collect the printing result from the image forming apparatus. As a result, the printing result to be handled with high security is left on a discharge tray, for example, of the image forming apparatus for a while, causing a problem that a high security level cannot be ensured for the printing result.

SUMMARY OF THE INVENTION

The present invention provides an image forming apparatus that is capable of ensuring a high security level, a method of controlling the image forming apparatus, an information processing apparatus, a method of controlling the information processing apparatus, and a storage medium.

In a first aspect of the present invention, there is provided an image forming apparatus comprising a security policy-setting unit configured to set a security policy specifying to reserve printing received print jobs, a reception unit configured to receive a print job, and a reservation unit configured to reserve printing the print job received by the reception unit when the security policy is set.

In a second aspect of the present invention, there is provided an information processing apparatus that is connected to an image forming apparatus including a security policy-setting unit configured to set a security policy specifying to reserve printing received print jobs, a reception unit configured to receive a print job, and a reservation unit configured to reserve printing the print job received by the reception unit when the security policy is set, comprising a transmission unit configured to transmit a secure print job to which the security policy is applied or a normal job other than the secure print job, as the print job, and a transmission setting unit configured to make a setting such that only the secure print job is transmitted in a case where the security policy is set.

In a third aspect of the present invention, there is provided a method of controlling an image forming apparatus, comprising setting a security policy specifying to reserve printing received print jobs, receiving a print job, and reserving the print job received by said receiving when the security policy is set.

In a fourth aspect of the present invention, there is provided a method of controlling an information processing apparatus that is connected to an image forming apparatus including a security policy-setting unit configured to set a security policy specifying to reserve printing received print jobs, a reception unit configured to receive a print job, and a reservation unit configured to reserve printing the print job received by the reception unit when the security policy is set, comprising transmitting a secure print job to which the security policy is applied or a normal job other than the secure print job, as the print job, and making a setting such that only the secure print job is transmitted in a case where the security policy is set.

In a fifth aspect of the present invention, there is provided a non-transitory computer-readable storage medium storing a computer-executable program for executing a method of controlling an image forming apparatus, wherein the method comprises setting a security policy specifying to reserve printing received print jobs, receiving a print job, and reserving the print job received by said receiving when the security policy is set.

In a sixth aspect of the present invention, there is provided a non-transitory computer-readable storage medium storing a computer-executable program for executing a method of controlling an information processing apparatus that is connected to an image forming apparatus including a security policy-setting unit configured to set a security policy specifying to reserve printing received print jobs, a reception unit configured to receive a print job, and a reservation unit configured to reserve printing the print job received by the reception unit when the security policy is set, wherein the method comprises transmitting a secure print job to which the security policy is applied or a normal job other than the secure print job, as the print job, and making a setting such that only the secure print job is transmitted in a case where the security policy is set.

According to the present invention, it is possible to ensure a high security level of the image forming apparatus.

Further features of the present invention will become apparent from the following description of exemplary embodiments (with reference to the attached drawings).

BRIEF DESCRIPTION OF THE DRAWINGS

FIG. 3A is a diagram useful in explaining a condition setting screen displayed on a PC display section appearing in FIG. 1.

FIG. 3B is a diagram useful in explaining a job authentication information-setting screen displayed on the PC display section.

FIG. 10 is a diagram useful in explaining a job authentication information input screen displayed on the console section of the MFP.

DESCRIPTION OF THE EMBODIMENTS

The present invention will now be described in detail below with reference to the accompanying drawings showing embodiments thereof.

Figure 1:
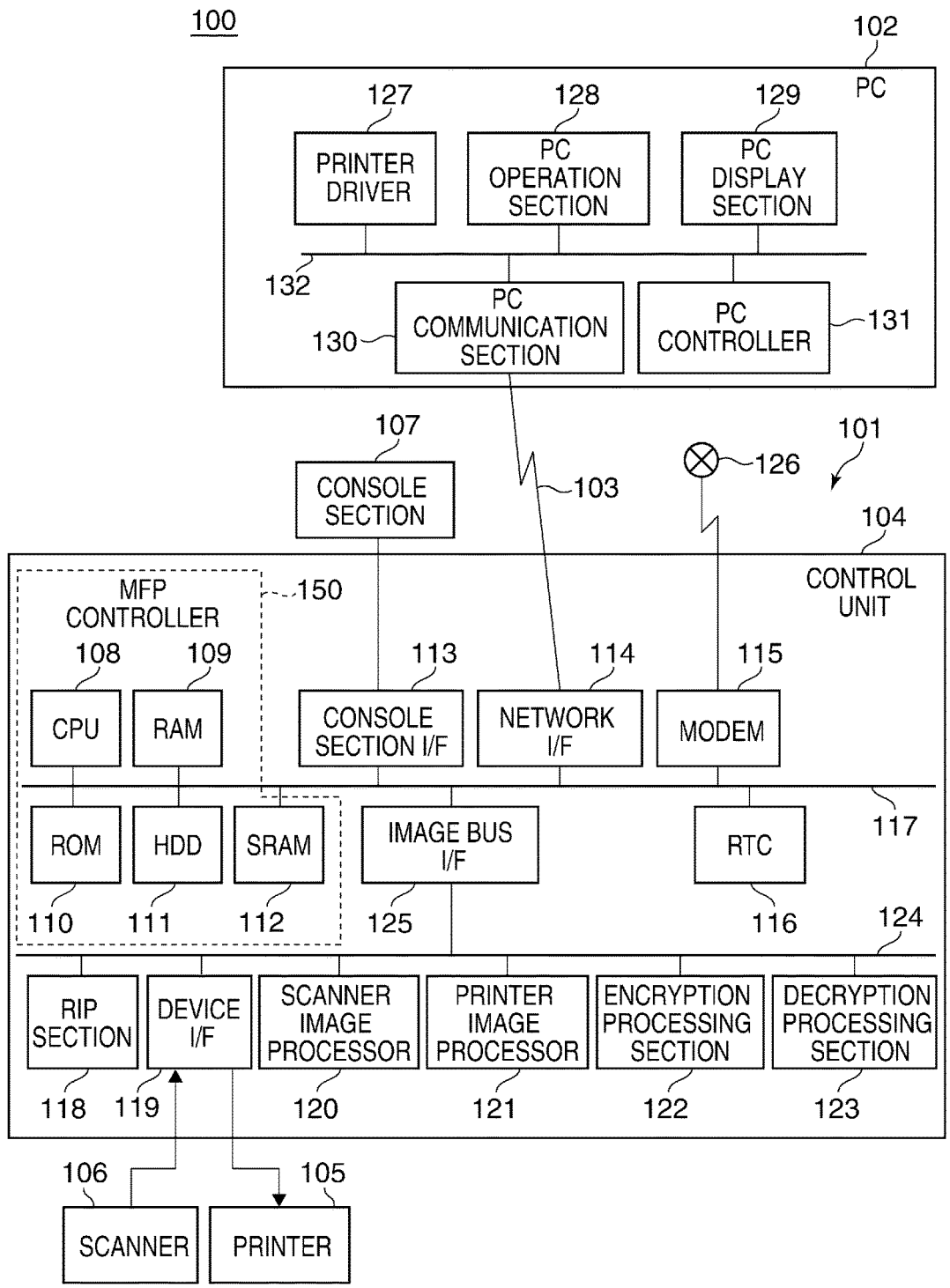
FIG. 1 is a block diagram of an image forming system including an MFP as an image forming apparatus according to a first embodiment of the present invention.

FIG. 1 is a block diagram of an image forming system 100 including an MFP (Multi-Function Printer) 101 as an image forming apparatus according to a first embodiment of the present invention.

The image forming system 100 shown in FIG. 1 includes the MFP 101 and a client PC 102 as an information processing apparatus, and the MFP 101 and the client PC 102 are connected to each other via a network, such as a LAN 103. The MFP 101 receives print jobs, such as a secure print job and a normal job, from the client PC 102.

The MFP 101 is comprised of a control unit 104, a printer 105, a scanner 106, and a console section 107. The control unit 104 includes a CPU 108, a RAM 109, a ROM 110, an HDD 111 (reservation unit), an SRAM 112, a console section interface 113, a network interface 114, a modem 115, and a RTC (Real Time Clock) 116, and these components are interconnected via a system bus 117.

Further, the control unit 104 includes a RIP section 118, a device interface 119, a scanner image processor 120, a printer image processor 121, an encryption processing section 122, and a decryption processing section 123, and these components are interconnected via an image bus 124. The system bus 117 is connected to the image bus 124 via an image bus interface 125. The console section interface 113, the network interface 114, and the modem 115 are connected to the console section 107, the LAN 103, and a public communication line 126, respectively, and the device interface 119 is connected to the printer 105 and the scanner 106.

The printer 105 prints e.g. image data acquired by the scanner 106 on a recording sheet. The scanner 106 reads an original, and generates image data corresponding to the read original. The console section 107 includes a console panel, such as a liquid crystal monitor, and hard keys, and a user inputs an instruction to the MFP 101 by operating the console panel and the hard keys.

The CPU 108 controls the components of the MFP 101 by causing programs stored in the ROM 110 to operate. The RAM 109 is a system work memory for the CPU 108, and temporarily stores image data and information received by the console section 107. The HDD 111 is a nonvolatile storage device, and stores various programs, and various data including user information which is formed by a user ID and a password and is used in MFP user authentication performed in a print job execution process, described hereinafter with reference to FIG. 7. Further, the HDD 111 stores a print job which has been transmitted from the client PC 102 and temporarily reserved without being immediately executed (hereinafter referred to as the "reserved print job").

Incidentally, when a reserved print job is stored in the HDD 111, an identification number for identifying the reserved print job and a user name of a user who has instructed transmission of the reserved print job to the MFP 101 are added to the reserved print job. As the user name added to the reserved print job, there is used, for example, a user name input to the client PC 102 during PC user authentication, described hereinafter. The SRAM 112 is a nonvolatile storage medium which operates at a high speed, and stores various programs, data, and the like.

The modem 115 transmits and receives information via the public communication line 126. The RTC 116 counts date and time even when electric power is not supplied to the control unit 104. The RIP section 118 converts, for example, image data described in an image description language to bitmap image data. The scanner image processor 120 performs various processing, such as correction, manipulation, and editing, on image data generated by the scanner 106. The printer image processor 121 performs various processing, such as correction, resolution conversion, and halftone processing, on image data to be printed on a recording sheet or the like by the printer 105. The encryption processing section 122 performs encryption processing on image data received by the MFP 101, and the decryption processing section 123 performs decryption processing on the data subjected to encryption processing.

The client PC 102 includes a printer driver 127 (setting unit), a PC operation section 128, a PC display section 129, a PC communication section 130 (transmission unit), and a PC controller 131, and these components are interconnected via a system bus 132. Further, the PC communication section 130 is connected to the LAN 103.

The printer driver 127 generates a secure print job and a normal print job. The generated secure print job has various print conditions and job authentication information set therein, and the generated normal job has only various print conditions set therein. The PC operation section 128 is, for example, an input device formed by a mouse and a keyboard. The PC display section 129 is, for example, a liquid crystal monitor, and displays various information. The PC communication section 130 transmits print jobs, such as a secure print job and a normal print job, to the MFP 101 via the LAN 103. The PC controller 131 controls the components of the client PC 102.

Figure 2:
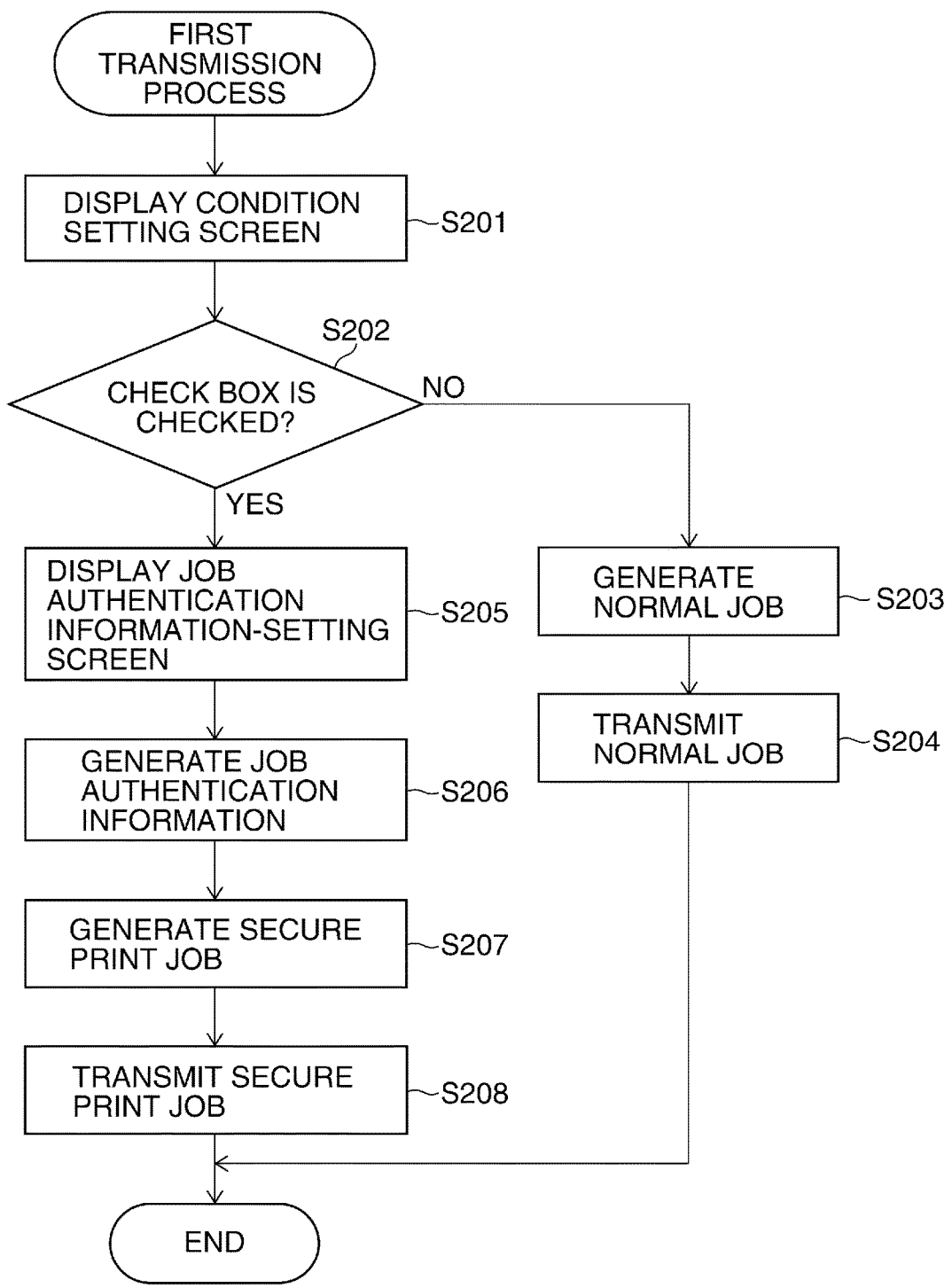
FIG. 2 is a flowchart of a first transmission process for transmitting a print job to the MFP, which is performed by a PC as an information processing apparatus appearing in FIG. 1.

FIG. 2 is a flowchart of a first transmission process performed by the client PC 102 appearing in FIG. 1, for transmitting a print job to the MFP 101. The first transmission process in FIG. 2 is performed by the PC controller 131 and the PC communication section 130.

Referring to FIG. 2, first, the PC controller 131 starts the printer driver 127, and displays a condition setting screen (see FIG. 3A) on the PC display section 129 (step S201). The condition setting screen includes a print condition-setting field 301, and a user sets print conditions to be applied when printing, including a size of a recording sheet and the number of copies, in the print condition-setting field 301. Further, the condition setting screen includes a check box 302 for setting the print job as a secure print job, and an OK button 303. When the user presses the OK button 303 after checking the check box 302, the printer driver 127 generates a secure print job as the print job, whereas when the user presses the OK button 303 without checking the check box 302, the printer driver 127 generates a normal job as the print job.

Referring again to FIG. 2, when the OK button 303 on the condition setting screen is pressed, the printer driver 127 determines whether or not the check box 302 is checked (step S202). If it is determined in the step S202 that the check box 302 is not checked, the print driver 127 generates a normal job (step S203), and transmits the generated normal job to the MFP 101 (step S204), followed by terminating the present process. If the check box 302 is checked, the printer driver 127 displays a job authentication information-setting screen (see FIG. 3B) for setting the job authentication information, on the PC display section 129 (step S205).

The job authentication information-setting screen includes an ID field 304 and a password field 305, and the user inputs character strings each formed by characters and/or numerals in the ID field 304 and the password field 305, respectively. The character string input in the ID field 304 is an ID as part of the job authentication information, and the character string input in the password field 305 is a password as the remaining part of the job authentication information. Then, when the user presses an OK button 306 provided on the job authentication information-setting screen, the printer driver 127 generates the job authentication information based on the character strings input in the ID field 304 and the password field 305, and further, generates a secure print job in which the generated job authentication information is set.

Although character strings are input in the ID field 304 and the password field 305 by the user, in a case where the client PC 102 performs user authentication (hereinafter referred to as "PC user authentication") by requesting a user who is about to use the client PC 102 to input a user name and a password, the user name which was input during the PC user authentication may be displayed in the ID field 304. Further, in a case where the user has registered a character string to be input in the password field 305, in the printer driver 127 in advance, the registered character string may be displayed in the password field 305.

Referring again to FIG. 2, when the OK button 306 is pressed, the printer driver 127 generates the job authentication information based on the character strings input in the ID field 304 and the password field 305 (step S206), generates a secure print job in which the generated job authentication information is set (step S207), and further, transmits the generated secure print job to the PC communication section 130. The PC communication section 130 transmits the secure print job received from the printer driver 127 to the MFP 101 (step S208), followed by terminating the present process.

Figure 4:
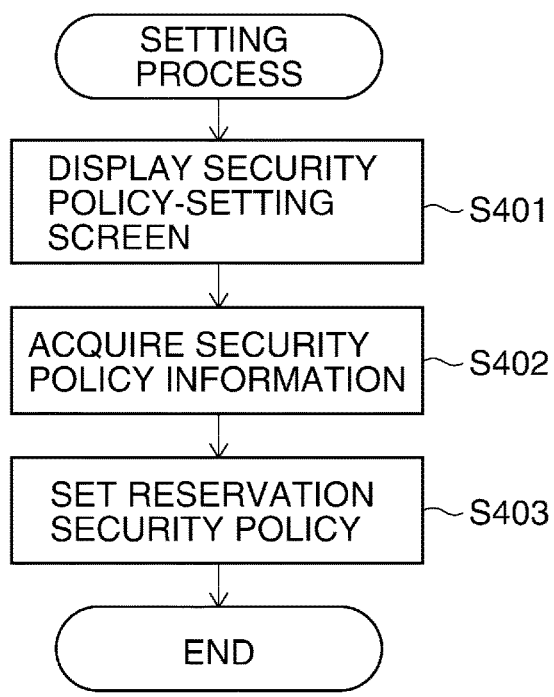
FIG. 4 is a flowchart of a setting process for setting a security policy for the MFP appearing in FIG. 1.

FIG. 4 is a flowchart of a setting process for setting a security policy for the MFP 101 appearing in FIG. 1. The setting process in FIG. 4 is performed by an MFP controller 150 appearing in FIG. 1, which is formed by the CPU 108, the RAM 109, the ROM 110, the HDD 111, and the SRAM 112.

Figure 5:
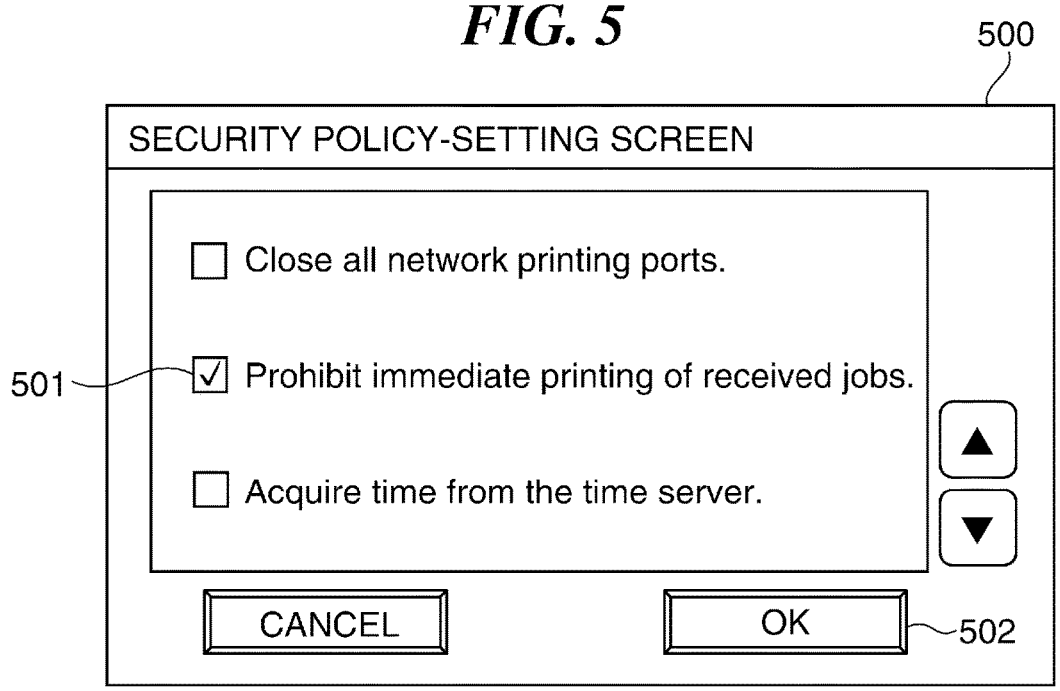
FIG. 5 is a diagram useful in explaining a security policy-setting screen displayed on a console section of the MFP.

Referring to FIG. 4, first, the MFP controller 150 (security policy-setting unit) displays a security policy-setting screen 500 (see FIG. 5) on the console section 107 (step S401). The security policy-setting screen 500 is provided with check boxes including a check box 501 for prohibiting immediate printing of received print jobs, and when the user presses an OK button 502 provided on the security policy-setting screen 500 after checking the check box 501, a security policy (hereinafter referred to as the "the reservation security policy") is set for the MFP 101, which specifies to reserve printing the received print jobs by necessarily storing the same in a storage device, such as the HDD 111, without immediately printing the same.

Referring again to FIG. 4, when the OK button 502 is pressed, MFP controller 150 acquires information on the security policy to be set for the MFP 101 by determining which of the check boxes has been checked (step S402), and analyzes the acquired information, and if the security policy set for the MFP 101 is the reservation security policy set by checking the check box 501, the MFP controller 150 sets the reservation security policy for the MFP 101 (step S403), followed by terminating the present process.

Figure 6:
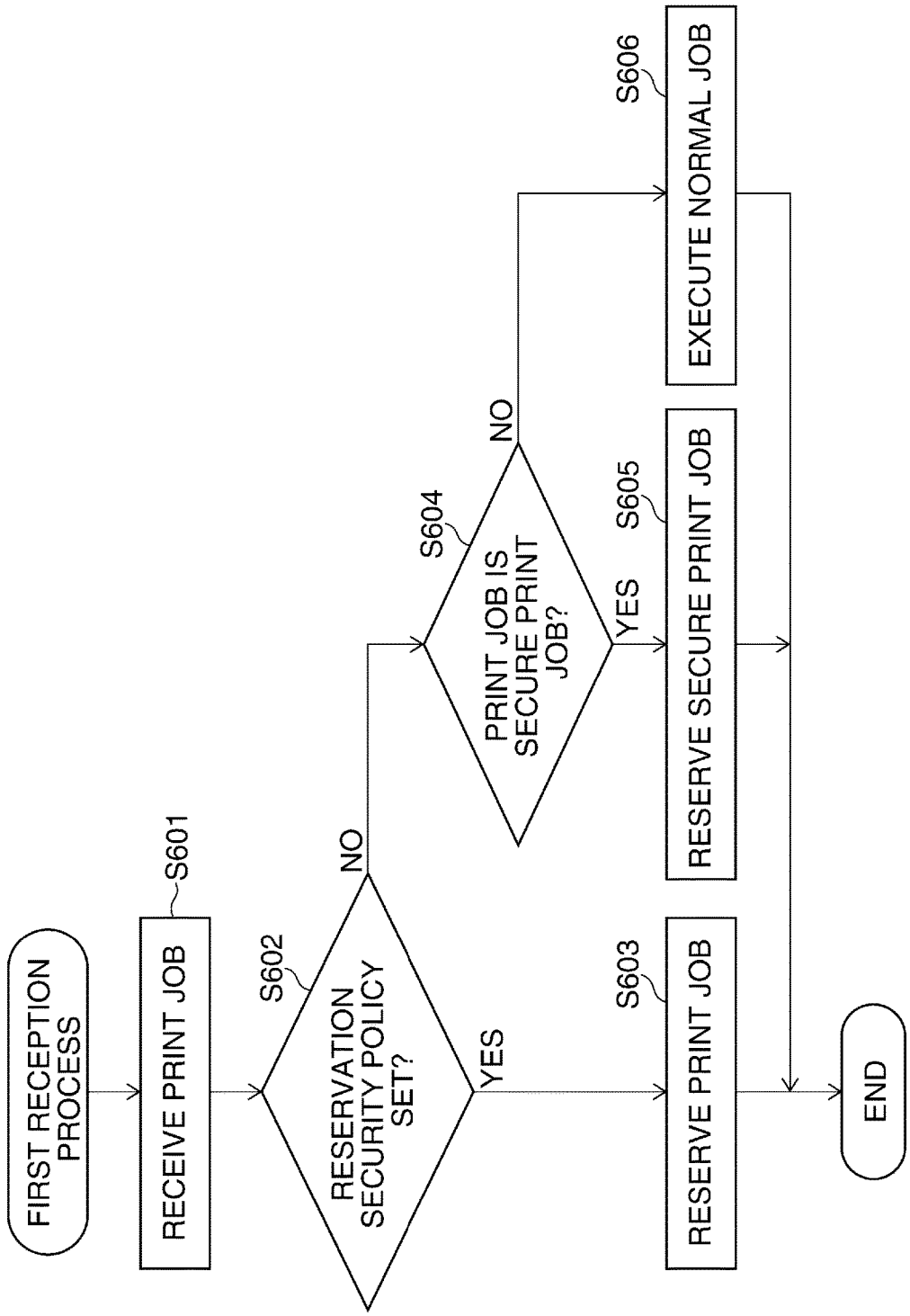
FIG. 6 is a flowchart of a first reception process performed by the MFP, for receiving a print job from the PC.

FIG. 6 is a flowchart of a first reception process performed by the MFP 101, for receiving a print job from the client PC 102. The first reception process in FIG. 6 is performed by the MFP controller 150 (reception unit).

Referring to FIG. 6, first, the MFP controller 150 receives a print job from the PC communication section 130 (step S601), and determines whether or not the reservation security policy is set (step S602). If it is determined in the step S602 that the reservation security policy is set, the MFP controller 150 reserves the received print job in the HDD 111 (step S603), followed by terminating the present process. That is, if the reservation security policy is set, even when the received print job is a normal job, the normal job is reserved in the HDD 111, but is not immediately executed. If the reservation security policy is not set, the MFP controller 150 determines whether or not the type of the received print job is a secure print job (step S604).

If it is determined in the step S604 that the type of the received print job is a secure print job, the MFP controller 150 reserves the secure print job which is the received print job in the HDD 111 (step S605), followed by terminating the present process, whereas if the type of the received print job is a normal job, the MFP controller 150 executes the received normal job (step S606), followed by terminating the present process.

Figure 7:
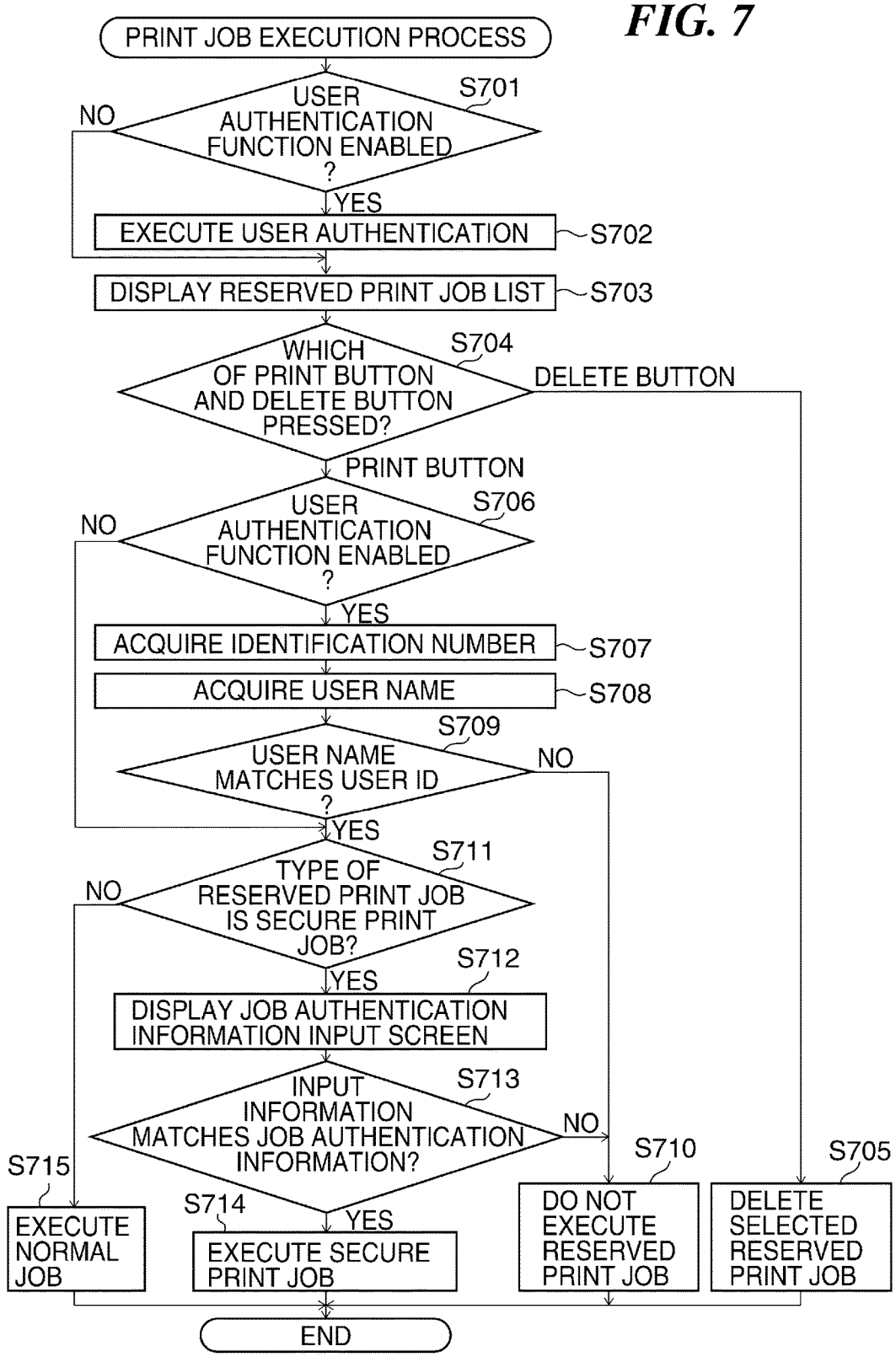
FIG. 7 is a flowchart of a print job execution process for executing a print job reserved in a step of the first reception process in FIG. 6.

FIG. 7 is a flowchart of the print job execution process for executing the print job reserved in the step S603 or S605 of the first reception process in FIG. 6. The print job execution process in FIG. 7 is executed by the MFP controller 150.

Figures 8, 9:
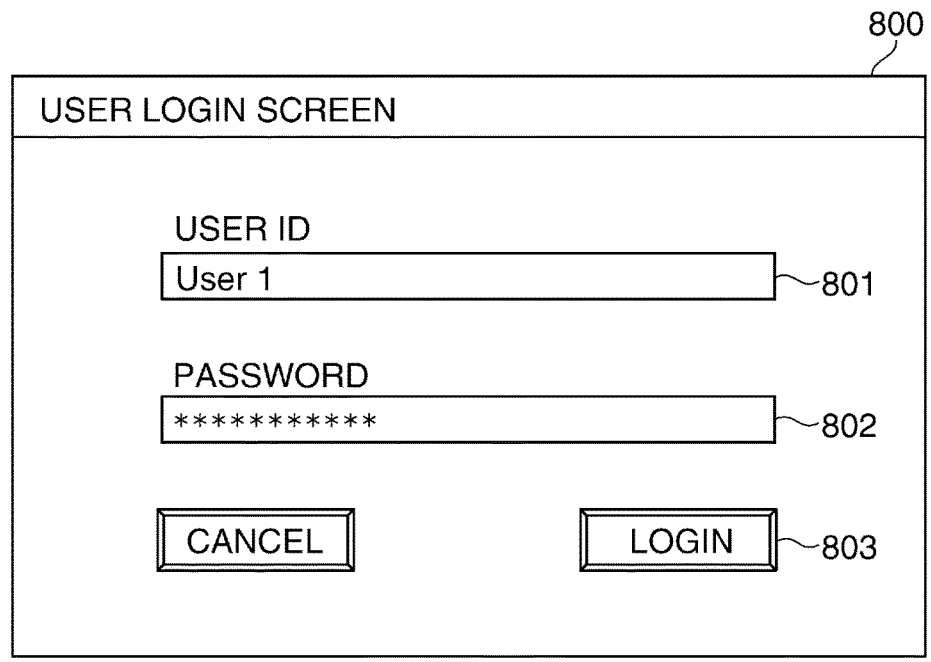
FIG. 8 is a diagram useful in explaining a user login screen displayed on the console section of the MFP.
FIG. 9 is a diagram useful in explaining a reserved print job list displayed on the console section of the MFP.

Referring to FIG. 7, first, the MFP controller 150 determines whether or not the MFP 101 is equipped with a user authentication function (hereinafter referred to as the "MFP user authentication function") for requesting user authentication (hereinafter referred to as "MFP user authentication") and the MFP user authentication function has been enabled (step S701). If it is determined in the step S701 that the MFP 101 is equipped with the MFP user authentication function and the MFP user authentication function has been enabled, the MFP controller 150 displays a user login screen 800 (see FIG. 8) on the console section 107, and performs MFP user authentication (step S702).

The user login screen 800 includes an ID entry field 801 and a password entry field 802, and the user inputs a user ID and a password in the ID entry field 801 and the password entry field 802, respectively, and presses a login button 803 provided on the user login screen 800. When the user login button 803 is pressed, the MFP controller 150 executes MFP user authentication based on the input user ID and password and the user information stored in the HDD 111. Note that in the illustrated example, it is assumed that the user inputs the user name added to the reserved print job, as the user ID to be input in the ID entry field 801.

Referring again to FIG. 7, after executing MFP user authentication, the MFP controller 150 displays a reserved print job list 900 (see FIG. 9) which is a list of print jobs reserved in the HDD 111, on the console section 107 (step S703). If it is determined in the step S701 that the MFP 101 is not equipped with the MFP user authentication function, or the MFP 101 is equipped with the MFP user authentication function but the MFP user authentication function has not been enabled, the MFP controller 150 skips the step S702, and proceeds to the step S703.

The reserved print job list 900 includes a reserved print job-displaying section 901 containing check boxes 902, a print button 903, and a delete button 904. The reserved print job-displaying section 901 displays e.g. a plurality of reserved print jobs, and the user checks one of the check boxes 902 associated with a reserved print job selected out of the plurality of reserved print jobs. After that, when the print button 903 is pressed, the selected reserved print job is executed, whereas when the delete button 904 is pressed, the selected reserved print job is deleted from the HDD 111. When the selected reserved print job is deleted from the HDD 111, the selected reserved print job is also deleted from the reserved print job list 900.

Further, the reserved print job-displaying section 901 displays a reception number 905 and a user name 906 of each reserved print job. The identification number and the user name added to each reserved print job are displayed as the reception number 905 and the user name 906, respectively.

Referring again to FIG. 7, the MFP controller 150 determines which of the print button 903 and the delete button 904 is pressed (step S704). If it is determined in the step S704 that the delete button 904 is pressed, the MFP controller 150 deletes the reserved print job selected on the reserved print job list 900 from the HDD 111 (step S705), followed by terminating the present process, whereas if the print button 903 is pressed, the MFP controller 150 determines whether or not the MFP 101 is equipped with the MFP user authentication function and the MFP user authentication function has been enabled (step S706).

If it is determined in the step S706 that the MFP 101 is equipped with the MFP user authentication function and the MFP user authentication function has been enabled, the MFP controller 150 acquires the identification number added to the selected reserved print job (step S707), acquires the user name added to the selected reserved print job (step S708), and determines whether or not the acquired user name matches the user ID input in the ID entry field 801 during execution of MFP user authentication (step S709).

If it is determined in the step S709 that the acquired user name does not match the user ID input in the ID entry field 801, the present process is terminated without executing the selected reserved print job (step S710), whereas if the acquired user name matches the user ID input in the ID entry field 801, the MFP controller 150 determines whether or not the type of the selected reserved print job is a secure print job (step S711).

If it is determined in the step S706 that the MFP 101 is not equipped with the MFP user authentication function or the MFP 101 is equipped with the MFP user authentication function but the MFP user authentication function has not been enabled, the MFP controller 150 skips the steps S707 to S710, and proceeds to the step S711.

If it is determined in the step S711 that the type of the selected reserved print job is a secure print job, the MFP controller 150 displays a job authentication information input screen 1000 (see FIG. 10) on the console section 107 (step S712), and the user inputs character strings in an ID entry field 1001 and a password entry field 1002 provided on the job authentication information input screen 1000, and presses an OK button 1003. The MFP controller 150 determines whether or not the character strings input in the ID entry field 1001 and the password entry field 1002 match the job authentication information set in the secure print job (step S713).

If it is determined in the step S713 that the character strings input in the ID entry field 1001 and the password entry field 1002 do not match the job authentication information set in the secure print job, the process proceeds to the step S710, whereas if the character strings input in the ID entry field 1001 and the password entry field 1002 match the job authentication information set in the secure print job, the secure print job is executed (step S714), followed by terminating the present process. If it is determined in the step S711 that the type of the selected reserved print job is a normal job, the normal job is executed (step S715), followed by terminating the present process.

According to the first reception process in FIG. 6, when the reservation security policy is set (YES to the step S602), the received print job is reserved in the HDD 111 (step S603), and hence even when the user erroneously instructs the MFP 101 to print the print data which should be printed as a secure print job high in security level, as a normal job not high in security level, i.e. even when a print job which should have been transmitted as a secure print job is transmitted as a normal job, the print job is not immediately executed. As a result, a printing result is prevented from being left on the MFP 101 for some time, which makes it possible to ensure the high security level for the printing result.

Next, a description will be given of a second embodiment of the present invention.

The second embodiment is basically the same in configuration and operation as the above-described first embodiment, and differs from the first embodiment in that when the MFP 101 is not equipped with the MFP user authentication function, or the MFP 101 is equipped with the MFP user authentication function but the MFP user authentication function has not been enabled, a normal job is not received. Therefore, redundant description of the configuration and operation is omitted, and the following description will be given only of different points.

Figure 11:
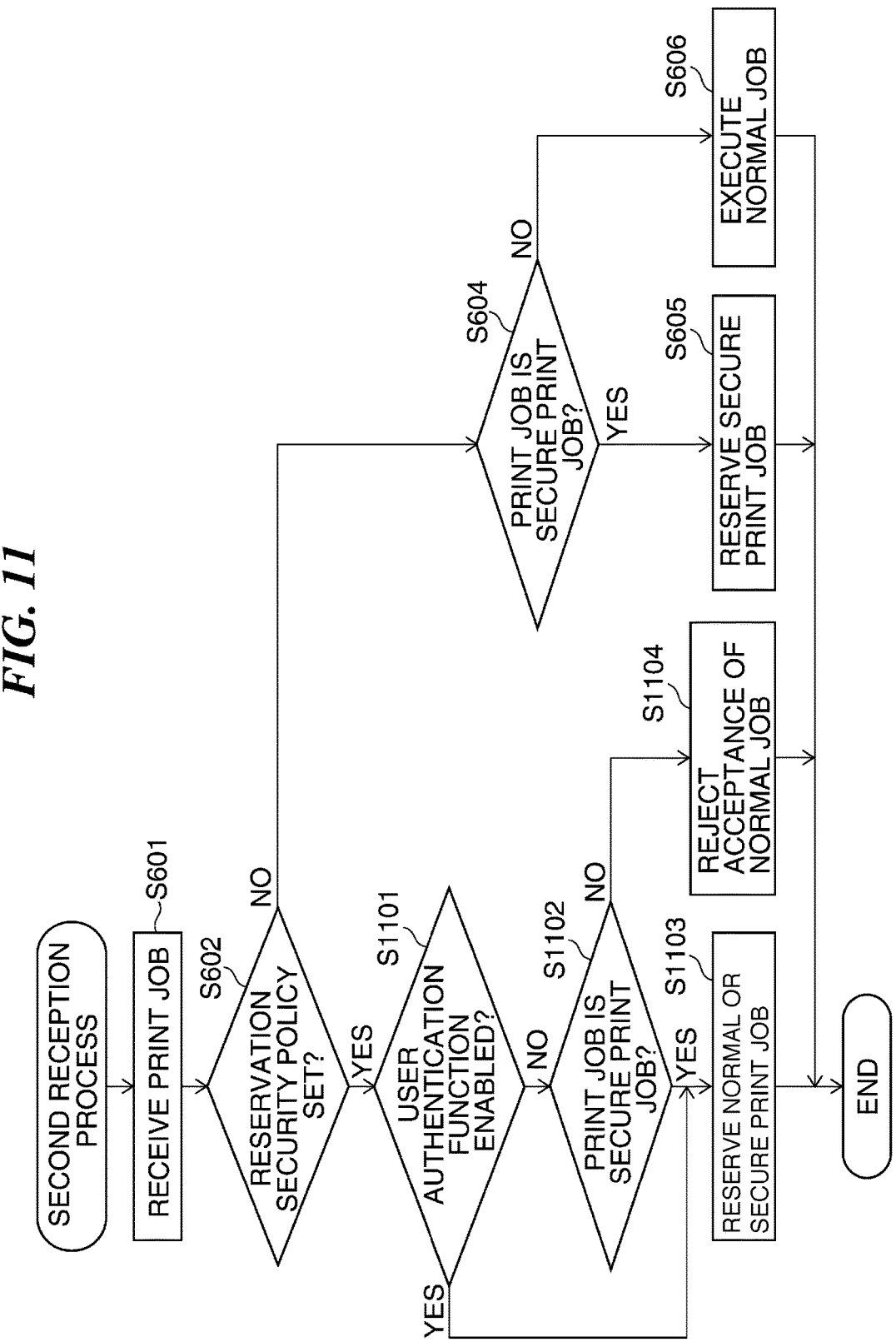
FIG. 11 is a flowchart of a second reception process performed by the MFP, for receiving a print job from the PC.

FIG. 11 is a flowchart of a second reception process performed by the MFP 101, for receiving a print job from the client PC 102. The second reception process in FIG. 11 is performed by the MFP controller 150. The steps S601, S602, and S604 to S606 in FIG. 11 are the same as the steps S601, S602, and S604 to S606 in FIG. 6, and hence only different points from FIG. 6 will be described.

Referring to FIG. 11, when the reservation security policy is set (YES to the step S602), the MFP controller 150 determines whether or not the MFP 101 is equipped with the MFP user authentication function and the MFP user authentication function has been enabled (step S1101). If it is determined in the step S1101 that the MFP 101 is equipped with the MFP user authentication function and the MFP user authentication function has been enabled, the MFP controller 150 reserves the received print job in the HDD 111 (step S1103), followed by terminating the present process. If the MFP 101 is not equipped with the MFP user authentication function, or the MFP 101 is equipped with the MFP user authentication function but the MFP user authentication function has not been enabled, the MFP controller 150 determines whether or not the type of the received print job is a secure print job (step S1102).

If it is determined in the step S1102 that the type of the received print job is a secure print job, the process proceeds to the step S1103, whereas if the type of the received print job is a normal job, the MFP controller 150 rejects acceptance of the normal job (step 1104), followed by terminating the present process.

According to the second reception process in FIG. 11, in a case where the MFP 101 is not equipped with the MFP user authentication function (NO to the step S1101), if the type of the received print job is a normal job (NO to the step S1102), acceptance of the normal job is rejected (step S1104), and hence even when a user erroneously instructs the MFP 101 to print data which should be printed as a secure print job, as a normal job, i.e. even when a print job which should have been transmitted as a secure print job is transmitted as a normal job, this normal job is not accepted by the MFP 101. This makes it possible to prevent a normal job from being executed by an instruction of an unidentified user, and a printing result of print data which should have been printed as a secure print job from being discharged, and thereby positively ensure a high security level for the printing result.

Further, according to the second reception process in FIG. 11, when the MFP 101 is equipped with the MFP user authentication function, but the MFP user authentication function has not been enabled (NO to the step S1101), if the type of a received print job is a normal job (NO to the step S1102), acceptance of the normal job is rejected (step S1104), and hence even when a print job which should have been transmitted as a secure print job is transmitted as a normal job, this normal job is not accepted by the MFP 101 in which the MFP user authentication function has not been enabled. This makes it possible to prevent the MFP 101 from executing a normal job according to an instruction of a user who has not been authenticated through MFP user authentication, and a printing result of the print data which should have been printed as a secure print job from being discharged, and thereby positively ensure a high security level for the printing result.

Next, a description will be given of a third embodiment of the present invention.

The third embodiment is basically the same in configuration and operation as the above-described first embodiment, and differs from the first embodiment in that in a case where the MFP 101 is equipped with the MFP user authentication function, and the reservation security policy is set for the MFP 101, the MFP user authentication function is enabled. Therefore, redundant description of the configuration and operation is omitted, and the following description will be given only of different points.

Figure 12:
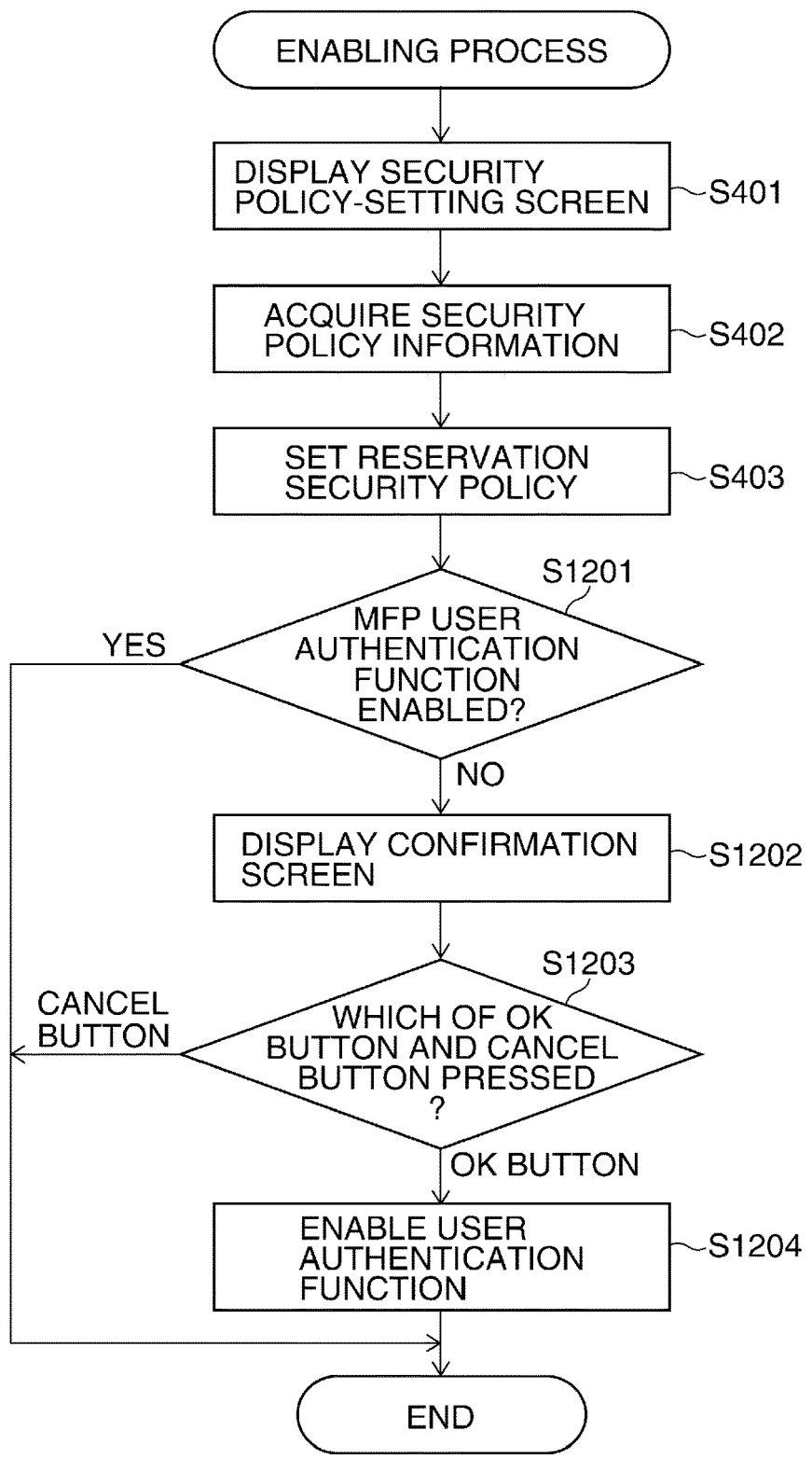
FIG. 12 is a flowchart of a process for enabling a MFP user authentication function after a reservation security policy is set for the MFP.

FIG. 12 is a flowchart of a process for enabling the MFP user authentication function after the reservation security policy is set for the MFP 101 appearing in FIG. 1. The process in FIG. 12 is performed by the MFP controller 150. The steps S401 to S403 in FIG. 12 are the same as the steps S401 to S403 in FIG. 4, and hence only different points from FIG. 4 will be described.

Figure 13:
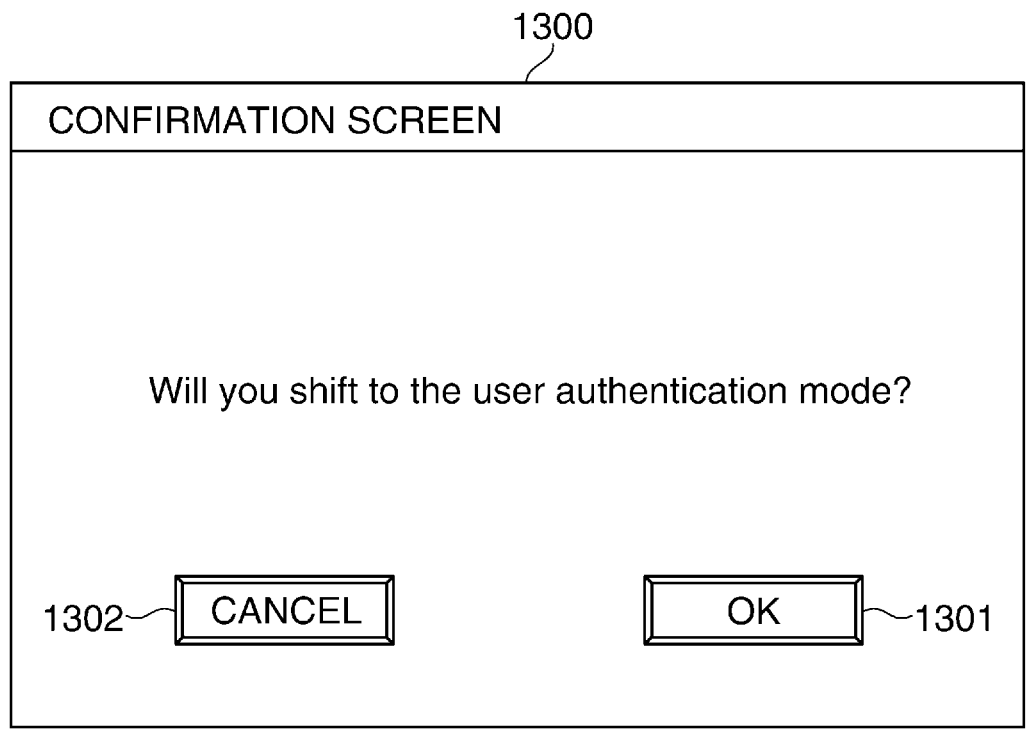
FIG. 13 is a diagram useful in explaining a confirmation screen displayed on the console section of the MFP.

Referring to FIG. 12, when the reservation security policy is set for the MFP 101 (step S403), the MFP controller 150 determines whether or not the MFP user authentication function equipped in the MFP 101 has been enabled (step S1201). If it is determined in the step S1201 that the MFP user authentication function has been enabled, the present process is terminated, whereas if the MFP user authentication function has not been enabled, the MFP controller 150 displays a confirmation screen 1300 (see FIG. 13) for prompting the user to confirm whether or not to enable the MFP user authentication function, on the console section 107 (step S1202), and determines which of an OK button 1301 and a cancel button 1302 provided on the confirmation screen 1300 is pressed (step S1203).

If it is determined in the step S1203 that the cancel button 1302 provided on the confirmation screen 1300 is pressed to give an instruction for not enabling the MFP user authentication function, the present process is immediately terminated, whereas if the OK button 1301 is pressed to given an instruction for enabling the MFP user authentication function, the MFP user authentication function is enabled (step S1204), followed by terminating the present process.

According to the enabling process in FIG. 12, when the reservation security policy is set for the MFP 101 (step S403), if the MFP user authentication function has not been enabled (NO to the step S1201), the user is prompted to confirm whether to enable the MFP user authentication function (step S1202), and when the user gives an instruction for enabling the MFP user authentication function (OK button in the step S1203), the MFP user authentication function is enabled (step S1204). Therefore, even when the user erroneously instructs the MFP 101 to print the print data which should be printed as a secure print job, as a normal job, i.e. even when a print job which should be transmitted as a secure print job is transmitted as a normal job and the transmitted normal job is received by the MFP 101, only a user authenticated by MFP user authentication is allowed to instruct the MFP 101 to execute this normal job, which makes it possible to prevent the received normal job from being executed by an instruction of a user not authenticated by MFP user authentication, and a printing result of print data which should have been printed as a secure print job from being discharged, and thereby positively ensure a high security level for the printing result.

Next, a description will be given of a fourth embodiment of the present invention.

The fourth embodiment is basically the same in configuration and operation as the above-described first embodiment, and differs from the first embodiment in that when the reservation security policy is set for the MFP 101, the client PC 102 controls the printer driver 127 to make it possible to transmit only a secure print job to the MFP 101. Therefore, redundant description of the configuration and operation is omitted, and the following description will be given only of different points.

Figure 14:
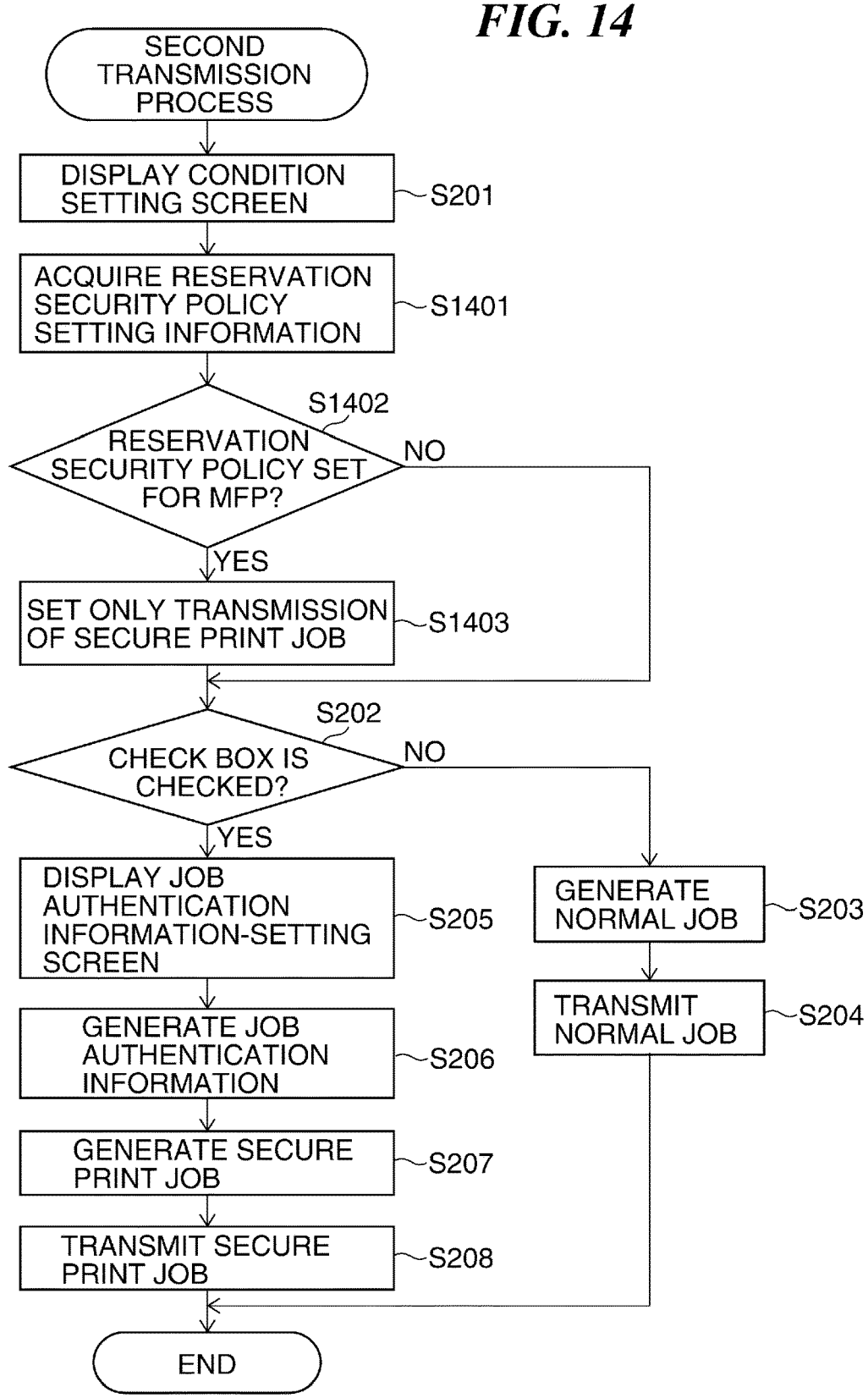
FIG. 14 is a flowchart of a second transmission process for transmitting a print job from the PC to the MFP.

FIG. 14 is a flowchart of a second transmission process for transmitting a print job from the client PC 102 to the MFP 101 in FIG. 1. The second transmission process in FIG. 14 is performed by the PC controller 131 and the PC communication section 130. The steps S201 to S208 in FIG. 14 are the same as the steps S201 to S208 in FIG. 2, and hence only different points from FIG. 2 will be described.

Referring to FIG. 14, first, the PC controller 131 starts the printer driver 127, and displays the condition setting screen (see FIG. 3A) on the PC display section 129 (step S201). Then, the printer driver 127 acquires information from the MFP 101, which specifies whether or not the reservation security policy is set for the MFP 101 (step S1401), and analyzes the acquired information to thereby determine whether or not the reservation security policy is set for the MFP 101 (step S1402).

If it is determined in the step S1402 that the reservation security policy is not set for the MFP 101, the process proceeds to the step S202, whereas if the reservation security policy is set for the MFP 101, the printer driver 127 checks the check box 302 provided on the condition setting screen, and controls the condition setting screen such that the user cannot delete the check mark from the check box 302, to thereby make a setting such that only a secure print job is transmitted to the MFP 101 (step S1403). Then, when the OK button 303 provided on the condition setting screen is pressed, the process proceeds to the step S202.

According to the second transmission process in FIG. 14, when the reservation security policy is set for the MFP 101 (YES to the step S1402), a setting is made such that only a secure print job is transmitted to the MFP 101 (step S1403), and hence the user is prevented from erroneously making a setting such that print data which should be printed as a secure print job is printed as a normal job. That is, it is impossible to transmit a print job which should be transmitted by a secure print job as a normal job. As a result, it is possible to prevent the MFP 101 in which the reservation security policy is set from performing a normal job by an instruction of an unidentified user and a printing result of the print data which should have been printed as a secure print job from being discharged, to thereby positively ensure a high security level for the printing result.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-054836 filed Mar. 18, 2015, which is hereby incorporated by reference herein in its entirety.

What is claimed is:

1. A printing apparatus having a reservation function of reserving a print job received from an external apparatus via a network, without executing the reserved job until at least a print instruction from a user is received, and a user authentication function of allowing an authenticated user to use the printing apparatus, the printing apparatus comprising:

a user interface that receives the print instruction from the user;

a network interface that receives, via the network, a secure print job, having a password set thereto, to which the password is required to be input when the secure print job is executed, or a non-secure print job, having no password set thereto, to which the password is not required to be input when the non-secure print job is executed;

at least one storage device; and at least one processor configured to implement instructions to execute a plurality of tasks, including:

a secure printing task that, in a case where the secure print job is received via the network interface, with the reservation function enabled:

stores the received secure print job in the at least one storage device regardless of whether or not the authentication function is enabled; and executes the stored secure print job in response to receipt of the print instruction via the user interface and the password set in the secure print job input via the user interface; and a non-secure printing task that, in a case where the non-secure print job is received via the network interface, with the reservation function enabled:
in a case where the user authentication function is enabled:
stores the received non-secure print job in the at least one storage device; and
executes the stored non-secure print job in response to reception of the print function via the user interface; and
in a case where the user authentication function is not enabled, does not executes the received non-secure print job.

2. The printing apparatus according to claim 1, wherein the plurality of tasks include an authenticated printing task that, in a case where the authentication function is enabled, executes the print job associated with the authenticated user, among print jobs stored in the at least one storage device.

3. The printing apparatus according to claim 1, wherein the plurality of tasks include no reservation printing task that executes the received non-secure print job without the print instruction via the user interface regardless of whether or not the user authentication is enabled, in a case where the non-secure print job is received via the network interface, without the reservation function enabled.

4. A method of controlling a printing apparatus having a reservation function of reserving a print job received from an external apparatus via a network, without executing the reserved job until at least a print instruction from a user is received, a user authentication function of allowing an authenticated user to use the printing apparatus, a user interface that receives the print instruction from the user, a network interface that receives, via the network, a secure print job, having a password set thereto, to which the password is required to be input when the secure print job is executed, or a non-secure print job, having no password set thereto, to which the password is not required to be input when the non-secure print job is executed, and at least one storage device, the method comprising the steps of:
in a case where the secure print job is received via the network interface, with the reservation function enabled:
storing the received secure print job in the at least one storage device regardless of whether or not the authentication function is enabled; and
executing the stored secure print job in response to receipt of the print instructions via the user interface and the password set in the secure print job input via the user interface; and
in a case where the non-secure print job is received via the network interface, with the reservation function enabled:
in a case where the user authentication function is enabled:
storing the received non-secure print job in the at least one storage device; and
executing the stored non-secure print job in response to reception of the print function via the user interface; and
in a case where the user authentication function is not enabled, not executing the received non-secure print job.

5. A printing having a reservation function of reserving a print job, received from an external apparatus via a network, without executing the reserved job until at least a print instruction from a user is received, and a user authentication function of allowing an authenticated user to use the printing apparatus, the image forming apparatus comprising:
a user interface that receives the print instruction from the user;
a network interface that receives, via the network, a secure print job, having a password set thereto, to which the password is required to be input when the secure print job is executed, or a non-secure print job, having no password set thereto, to which the password is not required to be input when the non-secure print job is executed;
at least one storage device; and
at least one processor configured to implement instructions to execute a plurality of tasks, including:
a reservation-authentication printing task that, in a case where both the reservation function and the user authentication are enabled, regardless of whether the received print job is the secure print job or the non-secure print job:
stores the received print job in the at least one storage device; and
executes the stored print job in response to at least receipt of the print instruction via the user interface; and
a reservation printing task that, in a case where the reservation function is enabled while the user authentication function is not enabled:
in a case where the received print job is the secure print job:
stores the received print job in the at least one storage device, and;
executes the stored secure print job in response to at least receipt of the print instruction via the user interface and the password set in the secure print job input via the user interface; and
in a case the received print job is the non-secure print job, not execute the received print job.

6. A method of controlling a printing apparatus having a reservation function of reserving a print job, received from an external apparatus via a network, without executing the reserved job until at least a print instruction from a user is received, and a user authentication function of allowing an authenticated user to use the printing apparatus, a user interface that receives the print instruction from the user, a network interface that receives, via the network, a secure print job, having a password set thereto, to which the password is required to be input when the secure print job is executed, or a non-secure print job, having no password set thereto, to which the password is not required to be input when the non-secure print job is executed, and at least one storage device, the method comprising the steps of:
in a case where both the reservation function and the user authentication are enabled, regardless of whether the received print job is the secure print job or the non-secure print job:
storing the received print job in the at least one storage device; and
executing the stored print job in response to at least receipt of the print instruction via the user interface; and
in a case where the reservation function is enabled while the user authentication function is not enabled:
in a case where the received print job is the secure print job:
storing the received print job in the at least one storage device; and executing the stored secure print job in response to at least receipt of the print instruction via the user interface and the password set in the secure print job input via the user interface; and in a case the received print job is the non-secure print job, not executing the received print job.

* * * * *